April 13, 1954  O. J. POUPITCH  2,675,044
NUT AND WASHER ASSEMBLY
Filed May 8, 1952
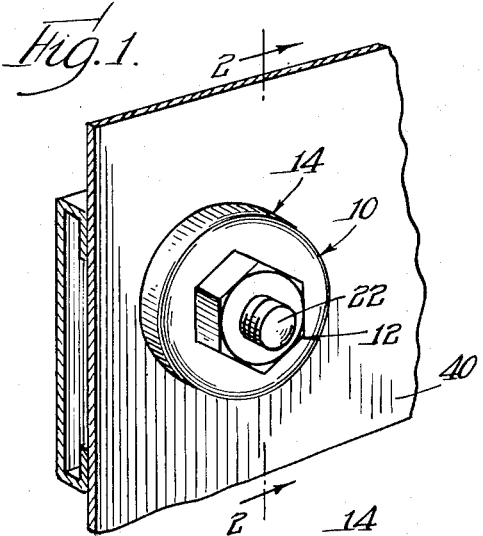
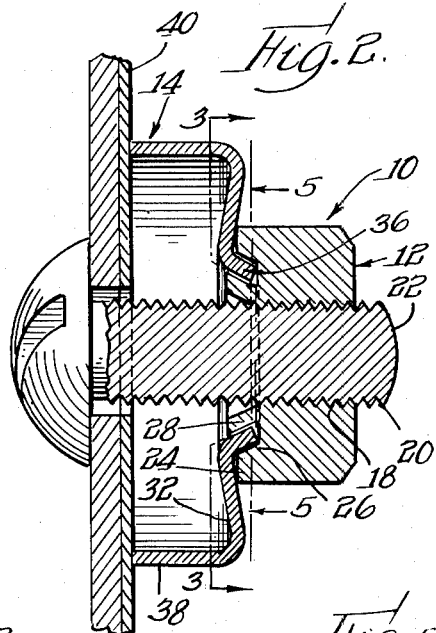
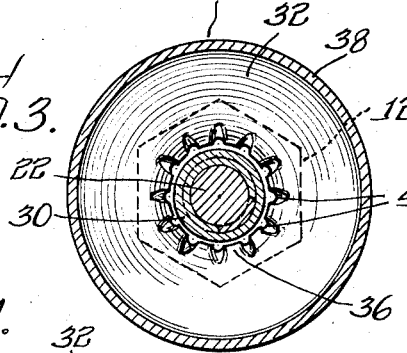
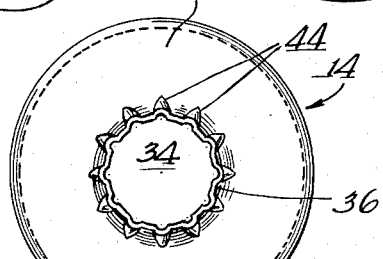
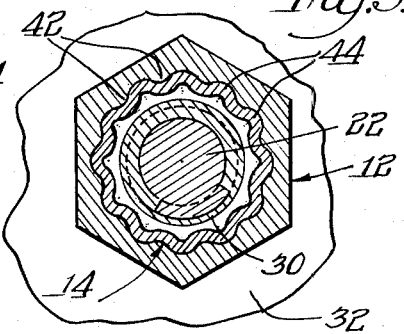
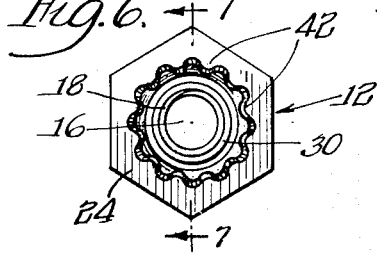
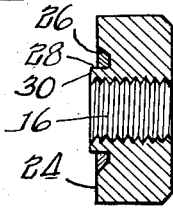
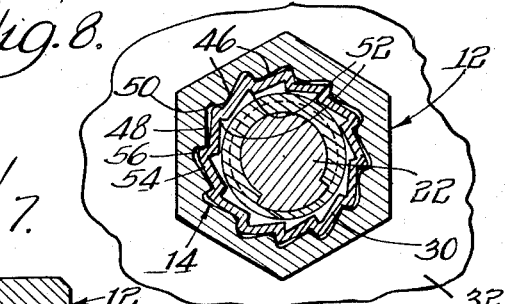
INVENTOR.
Ougljesa Jules
Poupitch
By: Moore, Olson & Trexler
Attys Patented Apr. 13, 1954

2,675,044

UNITED STATES PATENT OFFICE 2,675,044

NUT AND WASHER ASSEMBLY

Ougljesa Jules Poupitch, Chicago, Ill., assignor to Illinois Tool Works, Chicago, Ill., a corporation of Illinois Application May 8, 1952, Serial No. 286,748

7 Claims. (Cl. 151—41.5)

The present invention relates to a fastener unit, and more particularly to a fastener unit of the type having a rotary threaded fastener member, which carries a locking washer to make the unit self-locking.

When using fastener units of the above general type, it has been found that there are many instances where the use of conventional nuts and lock washers is undesirable since they tend to concentrate the clamping pressure to a limited area of the work piece, thereby causing injury thereto. One such instance is when the fastener unit is applied to a relatively thin sheet metal work piece, such as an automobile body or fender panel, where the concentration of clamping pressure may cause a deflection of such a panel. In such cases, it is desirable to use a washer which disturbs the clamping pressure so that the work piece will not be deflected. It is, therefore, an object of the present invention to provide a novel assembled fastener unit of suitable and economical construction, which unit comprises a rotary fastener member, such as a threaded nut, and a flexible lock washer rotatably carried by the nut, which washer is constructed to avoid injury to the work piece while yieldably engaging such nut to lock the unit after it has been tightened against the work.

A more specific object of this invention is to provide an above described type of fastener unit having a novel arrangement of inter-engaging surfaces on the nut and washer to increase the locking efficiency of the unit, which surfaces may be formed on and at the same time as means for retaining the parts in a preassembled unit, whereby the locking efficiency of the surfaces will not only be maintained, but will also be increased when the nut is tightened and the washer deflected and whereby the unit may be constructed very economically.

Another object of this invention is to provide a fastener unit of the above type, wherein the locking surfaces are arranged so that the nut may be rotated relatively easily with respect to the washer during the tightening of the unit and so that the surfaces inter-engage to resist unauthorized retrograde rotation of the nut after it has been tightened.

Other objects and advantages of the present invention will be apparent from the following description and the drawings, wherein:

Fig. 1 is a perspective view, showing a fastener unit involving the principles of the present invention assembled with a complementary screw element and a work piece;

Fig. 2 is a vertical cross section taken along line 2—2 in Fig. 1;

Fig. 3 is a vertical cross section taken along line 3—3 in Fig. 2;

Fig. 4 is a plan view, showing the novel lock washer utilized in this invention;

Fig. 5 is a vertical cross section taken along line 5—5 in Fig. 2;

Fig. 6 is a bottom view of a novel rotary fastener member, involving the principles of this invention;

Fig. 7 is a vertical cross section taken along line 7—7 in Fig. 6; and

Fig. 8 is a vertical cross section similar to Fig. 5, but showing a modified form of the present invention.

Referring now more specifically to the drawings, wherein like parts are designated by the same numeral throughout the figures, the fastener unit of this invention is shown in Figs. 1 and 2 and is generally designated by the numeral 10. The fastener unit 10 comprises a rotary fastener member or nut 12 and a lock washer 14.

The nut 12 is provided with a central bore or aperture 16, which is defined by helical screw threads 18, which are adapted to accommodate the threads 20 of the complementary screw 22. The nut 12 is provided with a bottom or work facing surface or face 24, which extends radially outwardly from the bore. An annular recess is formed in the face 24 for a purpose more fully described hereinbelow. The recess is generally defined by an outer wall surface 26 and an inner wall surface 28, which is spaced radially inwardly from the surface 26. As shown best in Fig. 2, the wall or surface 26 flares outwardly at an acute angle to the axis of the nut. The inner wall 28 is defined by the flange or skirt 30, which extends from the body of the nut between the recess and the bore. As shown in Fig. 7, the skirt 30 is initially formed so that the wall 28 extends parallel with the axis of the nut so that the washer 14 may be assembled with the nut, as more fully described below.

The washer 14, which is preferably constructed of sheet steel, is provided with a central body section 32, which is of slightly dished formation, as shown best in Fig. 2. The body section is provided with a central aperture 34 through which the complementary screw 22 may be passed. The marginal portion of the body section surrounding the aperture 34 is deflected outwardly to form a frusto-conical section or sleeve 36, which is adapted to be inserted within the recess in the nut, as shown in Fig. 2. The conical section or sleeve 36 is inserted within the recess while the flange 30 is in the position shown in Fig. 7, and thereafter the flange 30 is deformed so that the wall 28 is flared outwardly to a position substantially parallel with the wall 26 of the groove or recess. The wall 28 is shown in its outwardly flared position in Fig. 2, and in this position, the wall engages the under surface of the conical section 36 to retain the washer in preassembled relationship with the nut. While the wall 28 retains the washer, it is formed so that the washer is loosely held within the recess, so that relative rotation may take place between the washer and the nut.

The outer peripheral edge of the body section 32 of the washer terminates in an annular flange 38, which extends generally axially of the unit and away from the face 24 of the nut. The terminal edge of the flange 38 is adapted to engage the surface of the relatively thin sheet metal work piece 40 and transmit the clamping pressure thereto. It should be noted that the body section 32 is of such a size that it extends substantially radially outwardly from the nut 12, so that the flange 38 is positioned over a relatively great area of the work piece. Furthermore, the body section 32 should be of such a size as to assure that it has sufficient flexibility so that it may flex when the fastener unit is tightened on the screw element 22 and against the work piece 40, whereby the washer will yieldably urge the threads of the nut into engagement with the threads of the screw element.

In order to increase the locking efficiency of the device, it is a feature of the present invention that inter-engaging surfaces are provided on the nut 12 and the washer 14 for restraining the nut against retrograde rotation after it has been tightened. In accordance with the present invention, these surfaces take the form of protuberances 42 extending from the wall 26 of the groove in the nut 12. The conical section or sleeve 36 of the washer is formed with protuberances 44, which are adapted to extend between the protuberances 42, whereby the surfaces of the protuberances inter-engage and restrain relative rotation between the nut and the washer. As shown in Fig. 5, the protuberances 42 are provided by a series of fine serrations formed in the surface 26, which serrations extend generally axially of the nut. The protuberances 44 on the conical section or sleeve 36 are provided by undulations formed about the section. Both the protuberances 42 and the protuberances 44 may be conveniently formed during the same operations in which the recess is formed in the nut and the frusto-conical section 36 is formed in the washer.

When assembling the fastener unit 10 of this invention with a screw element to clamp a work piece, the nut 12 is threaded onto the screw element 22 until the terminal edge of the flange 38 of the washer engages the work piece. Further tightening of the nut causes the terminal edge of the washer frictionally to engage the work piece and restrain rotational movement of the washer so that marring of the work piece is prevented. As the nut is further tightened, the protuberances 44 will be slightly deflected and in addition the dish-shaped body section 32 of the washer is deflected downwardly by the pressure of the nut and the engagement between protuberances 42 and 44 to cause slight axial relative movement between the nut and the conical section 36 of the washer, whereby relative rotation between the nut and the washer is permitted.

The resiliency of the body section is such as to force the protuberances 42 and 44 into yieldable interlocking engagement, which engagement may be overcome by the application of torque to the nut by a wrench or like tool, while preventing unauthorized or inadvertent relative rotation between the nut and the washer. As the nut is tightened, the washer urges the inter-engaging protuberances together with a progressively increasing force, so that the locking effectiveness of the protuberances becomes increasingly greater. In addition, the resilient washer causes the threads 18 of the nut to grip the threads 20 of the screw, so that the increased frictional resistance between these threads further restrains the nut against unauthorized loosening. It is noted that the protuberances 42 and 44 shown in Fig. 5 are of such shape so that their inter-engaging surfaces will provide equal resistance to relative rotation between the parts either in a clockwise or counterclockwise direction. This form of the invention may be adapted for use with nuts having either a righthand or lefthand thread.

Fig. 8 shows a modified form of the invention, which is particularly adapted for use in fastener units, wherein the nut is provided with a righthand thread. In this embodiment, the nut is provided with protuberances 46, which protuberances have a cam surface 48 and a locking surface 50. The conical section of the washer is provided with protuberances 52, which have cam surfaces 54 and locking surfaces 56. When the device shown in Fig. 8 is used, it is seen that upon clockwise rotation of the nut, the cam surfaces 46 will slide over the cam surfaces 54 of the washer with relatively little resistance. However, any tendency for an unauthorized counterclockwise rotation of the nut will be resisted by the inter-engagement of locking surfaces 50 and 56. Thus, the embodiment shown in Fig. 8 provides a fastener unit, which may be easily tightened while still effectively resisting retrograde rotation of the nut. As in the embodiment of Figs. 1 to 7, the resiliency or flexibility of the washer of the embodiment shown in Fig. 8 is sufficient to enable the protuberances 46 of the nut to slide over the protuberances 52 of the washer in a counterclockwise direction when torque is applied to the nut with a wrench or other suitable tool. While the embodiment shown in Fig. 8 is particularly adapted for use with a right-hand threaded nut, it is clear that the structure could be modified for a left-hand threaded nut.

From the above description, it is seen that the present invention provides a simple nut and lock washer assembly, wherein the washer spreads the clamping pressure over a relatively large area of a work piece and wherein the inter-engaging surfaces are constructed and located so that they may be readily formed during the same operations required to form the recess in the nut and the frusto-conical section or sleeve of the washer, whereby the fastener unit may be produced very economically. Moreover, the present invention provides a fastener unit which possesses extremely efficient self-locking characteristics when fully tightened against the work piece, while enabling the nut to be rotated relatively easily during at least the initial phases of the tightening operation.

While I have shown and described the preferred embodiments of the present invention herein, it is obvious that many changes may be made without departing from the spirit and scope of the appended claims.

I claim:
1. A fastener unit, comprising a preassembled rotary fastener member having an opening defined by a complementary thread accommodating helix, and a resilient lock washer rotatably carried by said fastener member, said fastener member having a face extending radially from said opening and an annular recess in said face, said recess being defined by inner and outer radially spaced generally axially extending walls, a skirt extending from said fastener member between said recess and said opening, which skirt defines said inner wall, one of said walls having protuberances projecting generally radially therefrom, said washer having a flexible body section having a central aperture in alignment with said opening, the marginal aperture surrounding portion of said washer terminating in a generally axially extending frusto-conical section disposed within said recess, said inner wall having a portion thereof flared radially outwardly to retain said washer in said preassembled relationship with the fastener member, protuberances projecting generally radially from said frusto-conical section toward said first mentioned protuberances and adapted to inter-engage with said first mentioned protuberances to resist relative rotation between said washer and said fastener member when said fastener unit is in a work clamping position, said frusto-conical section when fully disposed within said recess being in engagement with said one recess wall having protuberances and spaced from the other recess wall to permit disengagement of the protuberances on the frusto-conical section and said one wall, and flange means extending from the peripheral edge of said washer body section in a direction generally axially away from said face for engaging a work surface and spacing the body section therefrom, whereby upon application of said fastener unit to a work piece, said body section may flex to provide yielding engagement between said protuberances to prevent relative rotation between the washer and the fastener member until a predetermined torque is applied thereto.

2. A fastener unit, as defined in claim 1, wherein said first mentioned protuberances extend from said outer wall of the recess.

3. A fastener unit, as defined in claim 1, wherein said protuberances include a cam surface and a locking surface, the cam surfaces of the protuberances extending from the wall being adapted to slide over the cam surfaces of the protuberances extending from the frusto-conical section to permit relative rotation between said washer and said nut in one direction, said locking surfaces being disposed to inter-engage and resist relative rotation in the opposite direction.

4. A fastener unit, as defined in claim 1, wherein said protuberances extend generally axially of said unit to provide inter-engaging surfaces for resisting relative rotation between said washer and said nut.

5. A fastener unit, as defined in claim 1, wherein said flexible body section extends radially substantially beyond the periphery of said rotary fastener member.

6. A fastener unit, as defined in claim 1, wherein said flexible body section is dished axially away from the face of the rotary fastener member to increase the flexibility of said body section.

7. A fastener unit, comprising a pre-assembled rotary fastener member and a lock washer, said fastener member having a central bore defined by a complementary thread accommodating helix, said fastener member having a work facing surface extending generally radially from said bore and an annular recess in said surface, said recess being defined by inner and outer radially spaced generally axially extending walls, a skirt extending from said fastener member for providing said inner wall, said outer wall having protuberance means projecting generally radially therefrom, said washer having a generally radially extending flexible body section provided with a central aperture, the aperture surrounding marginal portion of the washer body section terminating in a generally axially extending sleeve disposed within said recess, said skirt having at least a portion thereof flared generally radially outwardly to retain the washer in pre-assembled relationship with the fastener member, said sleeve having protuberance means projecting generally radially therefrom and toward said first mentioned protuberance means for interengagement with said first mentioned protuberance means to resist relative rotation between the washer and the fastener member when the fastener unit is in a work clamping position, said sleeve when fully disposed within said recess being in engagement with said outer recess wall and spaced from said inner recess wall to permit disengagement of said protuberances on said sleeve and said outer recess wall, and flange means extending from the peripheral edge of said flexible washer body section in a direction generally axially away from said work facing surface for engaging a work piece and spacing the body section therefrom, whereby upon application of the fastener unit to a work piece, said body section may flex to provide yielding engagement between said protuberance means to prevent relative rotation between the washer and the fastener member until a predetermined torque is applied thereto.

References Cited in the file of this patent

UNITED STATES PATENTS

| Number | Name | Date |
|---|---|---|
| 769,199 | Tower | Sept. 6, 1904 |
| 1,228,130 | Price | May 29, 1917 |
| 1,244,039 | Droll | Oct. 23, 1917 |
| 1,924,695 | Olson | Aug. 29, 1933 |
| 2,498,221 | Poupitch | Feb. 21, 1950 |
| 2,619,146 | Poupitch | Nov. 25, 1952 |

FOREIGN PATENTS

| Number | Country | Date |
|---|---|---|
| 797 | Great Britain | Jan. 11, 1911 |